(12) United States Patent
     Park

(10) Patent No.:     US 9,277,380 B2
(45) Date of Patent:     Mar. 1, 2016

(54) METHOD FOR CONTROLLING CALL TERMINATION BASED ON GAZE, AND MOBILE COMMUNICATION TERMINAL THEREFOR

(71) Applicant: Hyundai Motor Company, Seoul (KR)

(72) Inventor: Sung Min Park, Seoul (KR)

(73) Assignee: HYUNDI MOTOR COMPANY, Seoul (KR)

( * ) Notice: Subject to any disclaimer, the term of this patent is extended or adjusted under 35 U.S.C. 154(b) by 70 days.

(21) Appl. No.: 13/886,140

(22) Filed: May 2, 2013

(65) Prior Publication Data

US 2014/0171037 A1    Jun. 19, 2014

(30) Foreign Application Priority Data

Dec. 18, 2012    (KR) .......................... 10-2012-0148370

(51) Int. Cl.
    *H04M 3/42*    (2006.01)
    *H04W 4/16*    (2009.01)
(52) U.S. Cl.
    CPC ........................................ *H04W 4/16* (2013.01)
(58) Field of Classification Search
    CPC .............................. H04W 4/16; H04W 52/0254
    USPC ............... 455/420, 566, 456.2, 556.1, 414.1; 345/156, 697, 589, 158, 173, 8; 600/558; 434/236
    See application file for complete search history.

(56) References Cited

U.S. PATENT DOCUMENTS

| | | | |
|---|---|---|---|
| 6,377,699 B1* | 4/2002 | Musgrave et al. | 382/117 |
| 2010/0079508 A1* | 4/2010 | Hodge et al. | 345/697 |
| 2012/0083312 A1* | 4/2012 | Kim | 455/556.1 |
| 2013/0135196 A1* | 5/2013 | Park et al. | 345/156 |
| 2013/0187847 A1* | 7/2013 | Tsou et al. | 345/156 |
| 2013/0307771 A1* | 11/2013 | Parker et al. | 345/158 |
| 2014/0096076 A1* | 4/2014 | Ashbrook et al. | 715/808 |

FOREIGN PATENT DOCUMENTS

| | | |
|---|---|---|
| JP | 2010-267071 A | 11/2010 |
| JP | 2012-142878 A | 7/2012 |
| KR | 10-0646031 B1 | 11/2006 |
| KR | 10-2007-0072252 A | 7/2007 |
| KR | 10-2010-0006652 A | 1/2010 |
| KR | 10-2011-0017236 A | 2/2011 |
| KR | 10-2012-0056936 A | 6/2012 |
| KR | 10-2012-0121982 A | 11/2012 |

* cited by examiner

*Primary Examiner* — Kiet Doan
(74) *Attorney, Agent, or Firm* — McDermott Will & Emery LLP

(57) ABSTRACT

A mobile communication terminal for controlling call termination based on a user's gaze includes a call answer and decline judging unit configured to compare a user's gaze movement frequency with preset call answer and call decline frequencies and judge a call answer or a call decline according to frequencies coinciding with each other; and a call termination control processing unit configured to perform a call mode or a call refusal mode according to the judgment of the call answer and decline judging unit.

8 Claims, 3 Drawing Sheets

METHOD FOR CONTROLLING CALL TERMINATION BASED ON GAZE, AND MOBILE COMMUNICATION TERMINAL THEREFOR

CROSS-REFERENCE TO RELATED APPLICATION

This application is based on and claims benefit of priority to Korean Patent Application No. 10-2012-0148370, filed on Dec. 18, 2012 in the Korean Intellectual Property Office, the disclosure of which is incorporated herein in its entirety by reference.

TECHNICAL FIELD

The present disclosure relates to a method for controlling call termination based on a user's gaze, and a mobile communication terminal therefor.

BACKGROUND

Currently, various types of portable phones including cellular phones have been provided to users. Recently, the portable phone screens have frequently used a capacitive touch scheme.

A fine current in a living body is required in order to input a control signal for operating the capacitive touch screen. Thus, it is impossible to control the capacitive touch screen in a state in which the user wears general gloves.

Therefore, persons using the portable phone during the winter season or persons having special jobs have frequently complained about the inconvenience in operating the portable phone due to wearing of the gloves.

In order to solve this problem, touch pens or conductive gloves have been provided. However, since an additional product should be purchased, and there exits a risk of losing the additional product, many users have operated the portable phones after taking off the gloves while enduring the inconvenience.

SUMMARY

Accordingly, the present disclosure has been made to solve the above-mentioned problems occurring in the prior art while advantages achieved by the prior art are maintained intact.

One subject to be achieved by the present disclosure is to provide a method for controlling call termination based on a gaze capable of controlling a mobile communication terminal even in a situation in which a touch operation of the mobile communication terminal is difficult at the time of call termination, and a mobile communication terminal therefor.

In one aspect of the present invention, there is provided a mobile communication terminal for controlling call termination based on a gaze, the mobile communication terminal including: a wireless communicating unit; a call termination control mode managing unit changing a mode of the mobile communication terminal into a call termination control mode as a call connection request is received from an originating mobile communication terminal, thereby allowing a gaze movement frequency detecting screen to be displayed; an image detecting unit detecting a user's eyeball image moving according to the display of the gaze movement frequency detecting screen through a camera apparatus; a gaze movement frequency detecting unit detecting a user's gaze movement frequency based on the user's eyeball image; a call answer and decline judging unit comparing the user's gaze movement frequency with preset call answer and call decline frequencies and judging a call answer or a call decline according to frequencies coinciding with each other; and a call termination control processing unit performing a call mode or a call refusal mode according to the judgment of the call answer and decline judging unit.

The call termination control mode managing unit may display a call answer section displaying a pointer moving according to the call answer frequency and a call decline section displaying a pointer moving according to the call decline frequency on the gaze movement frequency detecting screen.

The gaze movement frequency detecting unit may perform the Fourier transform or the unequally spaced fast Fourier transform on the user's eyeball image moving according to the pointer of the call answer section or the call decline section to detect the user's gaze movement frequency.

The mobile communication terminal may further include: a storing unit storing terminal related information including the call answer frequency and the call decline frequency therein; and an outputting unit displaying the gaze movement frequency detecting screen according to a request of the call termination control mode managing unit and outputting the terminal related information in at least one form of a text, an image, and an audio.

In another aspect of the present invention, there is provided a method for controlling call termination based on a gaze in a mobile communication terminal, the method including: receiving, by the mobile communication terminal, a call connection request from an originating mobile communication terminal; changing a mode of the mobile communication terminal into a call termination control mode to display a gaze movement frequency detecting screen; detecting, by the mobile communication terminal, a user's eyeball image moving according to the display of the gaze movement frequency detecting screen; detecting, by the mobile communication terminal, a user's gaze movement frequency based on the user's eyeball image; comparing, by the mobile communication terminal, the user's gaze movement frequency with preset call answer and call decline frequencies to confirm whether or not they coincide with each other; and changing the mode of the mobile communication terminal into a call mode in the case in which the user's gaze movement frequency coincides with the call answer frequency.

The method may further include, after the comparing of the user's gaze movement frequency with the preset call answer and call decline frequencies by the mobile communication terminal to confirm whether or not they coincide with each other, changing the mode of the mobile communication terminal into a call refusal mode in the case in which the user's gaze movement frequency coincides with the call decline frequency.

In the changing of the mode of the mobile communication terminal into the call termination control mode to display the gaze movement frequency detecting screen, a call answer section displaying a pointer moving according to the call answer frequency and a call decline section displaying a pointer moving according to the call decline frequency may be displayed on the gaze movement frequency detecting screen.

In the detecting of the user's gaze movement frequency based on the user's eyeball image by the mobile communication terminal, the Fourier transform or the unequally spaced fast Fourier transform may be performed on the user's eyeball image moving according to the pointer of the call answer section or the call decline section to detect the user's gaze movement frequency.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Figure 1:
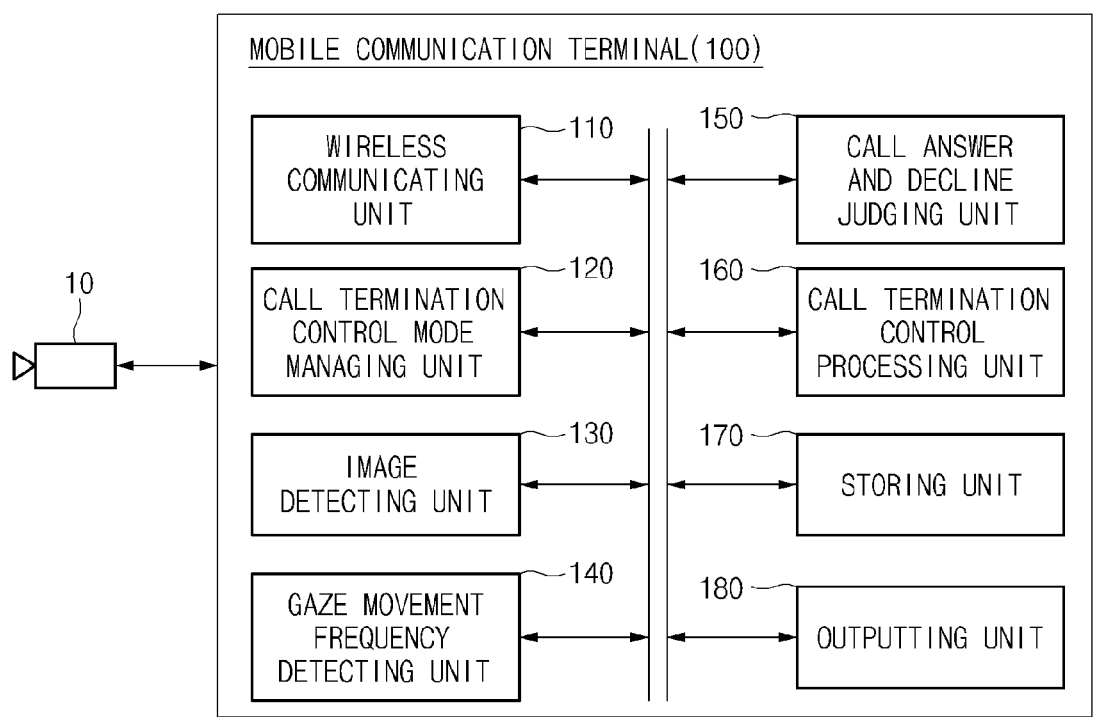
FIG. 1 is a view showing a configuration of a mobile communication terminal according to an exemplary embodiment of the present disclosure.

Various features and advantages of the present disclosure will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the best method he or she knows for carrying out the invention.

The above and other objects, features and advantages of the present disclosure will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present disclosure may obscure the gist of the present inventive concept, the detailed description thereof will be omitted. In the description, the terms "first", "second", and so on are used to distinguish one element from another element, and the elements are not defined by the above terms.

Hereinafter, preferred embodiments of the present disclosure will be described in detail with reference to the accompanying drawings.

Figure 2:
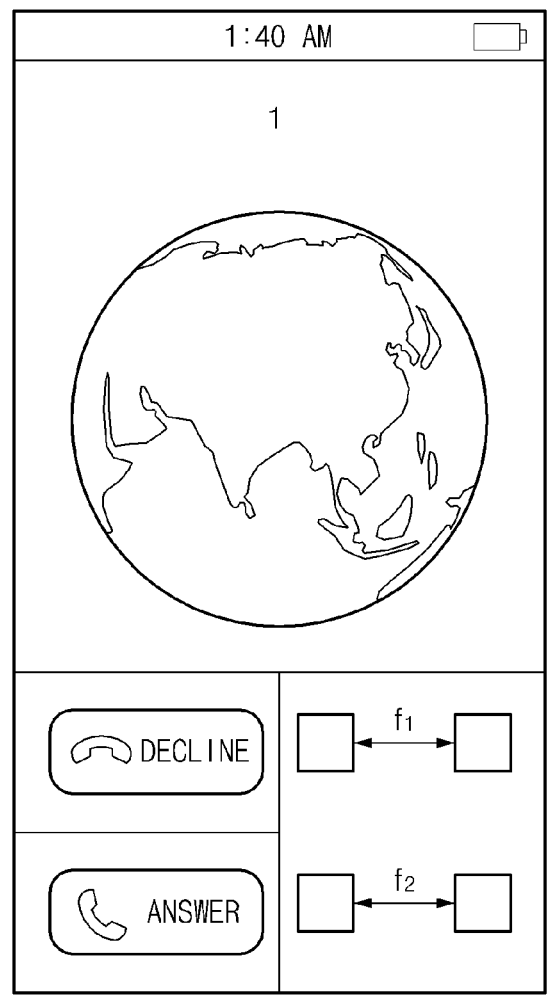
FIG. 2 is a view showing a screen display example of a mobile communication terminal according to the exemplary embodiment of the present disclosure.

FIG. 1 is a view showing a configuration of a mobile communication terminal according to an exemplary embodiment of the present disclosure, which will be described with reference to FIG. 2 showing a screen display example of the mobile communication terminal.

As shown in FIG. 1, the mobile communication terminal 100 may include a wireless communicating unit 110, a call termination control mode managing unit 120, an image detecting unit 130, a gaze movement frequency detecting unit 140, a call answer and decline judging unit 150, a call termination control processing unit 160, a storing unit 170, and an outputting unit 180.

More specifically, the call termination control mode managing unit 120 may change a mode of the mobile communication terminal into a call termination control mode as a call connection request is received from an originating mobile communication terminal (not shown), which thereby displays a gaze movement frequency detecting screen.

In addition, the call termination control mode managing unit 120 may display a call answer section displaying a pointer moving according to a call answer frequency, and a call decline section displaying a pointer moving according to a call decline frequency on the gaze movement frequency detecting screen.

For example, as shown in FIG. 2, the call termination control mode managing unit 120 displays the call answer section and the call decline section through the outputting unit 180 and allows a user to move his/her gaze according to movement of a pointer (not shown) moving according to a call answer frequency $f_2$ and a call decline frequency $f_1$, each being displayed on the call answer section and the call decline section.

That is, the gaze movement frequency detecting screen, outputted through the call termination control mode managing unit 120, detects a gaze movement frequency for call answer or call decline selected by the user.

In addition, the image detecting unit 130 may detect a user's eyeball image moving according to the display of the gaze movement frequency detecting screen through a camera apparatus 10.

Here, the camera apparatus 10, which is mounted in the mobile communication terminal 100, photographs movement of eyes generated by a user's gaze and transfers the photographed image to the image detecting unit 130.

In addition, the gaze movement frequency detecting unit 140 may detect a user's gaze movement frequency based on the user's eyeball image.

In addition, the gaze movement frequency detecting unit 140 may perform the Fourier transform or the unequally spaced fast Fourier transform on the user's eyeball image moving according to the pointer of the call answer section or the call decline section to detect the user's gaze movement frequency.

Here, the gaze movement frequency detecting unit 140 may recognize user's gaze movement from the user's eyeball image detected through the image detecting unit 130, and perform the Fourier transform or the unequally spaced fast Fourier transform on the recognized user's gaze movement information to detect the user's gaze movement frequency.

Meanwhile, the gaze movement frequency detecting unit 140 is not limited to applying the Fourier transform or the unequally spaced fast Fourier transform when it detects the user's gaze movement frequency, but may also apply another frequency detection method as needed by an operator.

The call answer and decline judging unit 150 may compare the user's gaze movement frequency with preset call answer and call decline frequencies and judge a call answer or a call decline according to frequencies coinciding with each other.

More specifically, the call answer and decline judging unit 150 may judge the call decline in the case in which an absolute value of a difference between the user's gaze movement frequency ($f_{eye}$) and the call decline frequency ($f_1$) is equal to or smaller than a reference value through $|f_{eye}-f_1| \le \epsilon_{thres}$ and judge the call answer in the case in which an absolute value of a difference between the user's gaze movement frequency ($f_{eye}$) and the call answer frequency ($f_2$) is equal to or smaller than a reference value through $|f_{eye}-f_2| \le \epsilon_{thres}$.

In addition, the call termination control processing unit 160 may perform a call mode or a call refusal mode according to the judgment of the call answer and decline judging unit 150.

At the time of performing the call refusal mode, the call termination control processing unit 160 may transfer a signal indicating that call termination is impossible, to the originating mobile communication terminal (not shown) through an audio or a message.

The storing unit 170 may store terminal related information including the call answer frequency and the call decline frequency therein.

The outputting unit 180 may display the gaze movement frequency detecting screen according to a request of the call termination control mode managing unit 120 and output the terminal related information in at least one form of a text, an image, and an audio.

Figure 3:
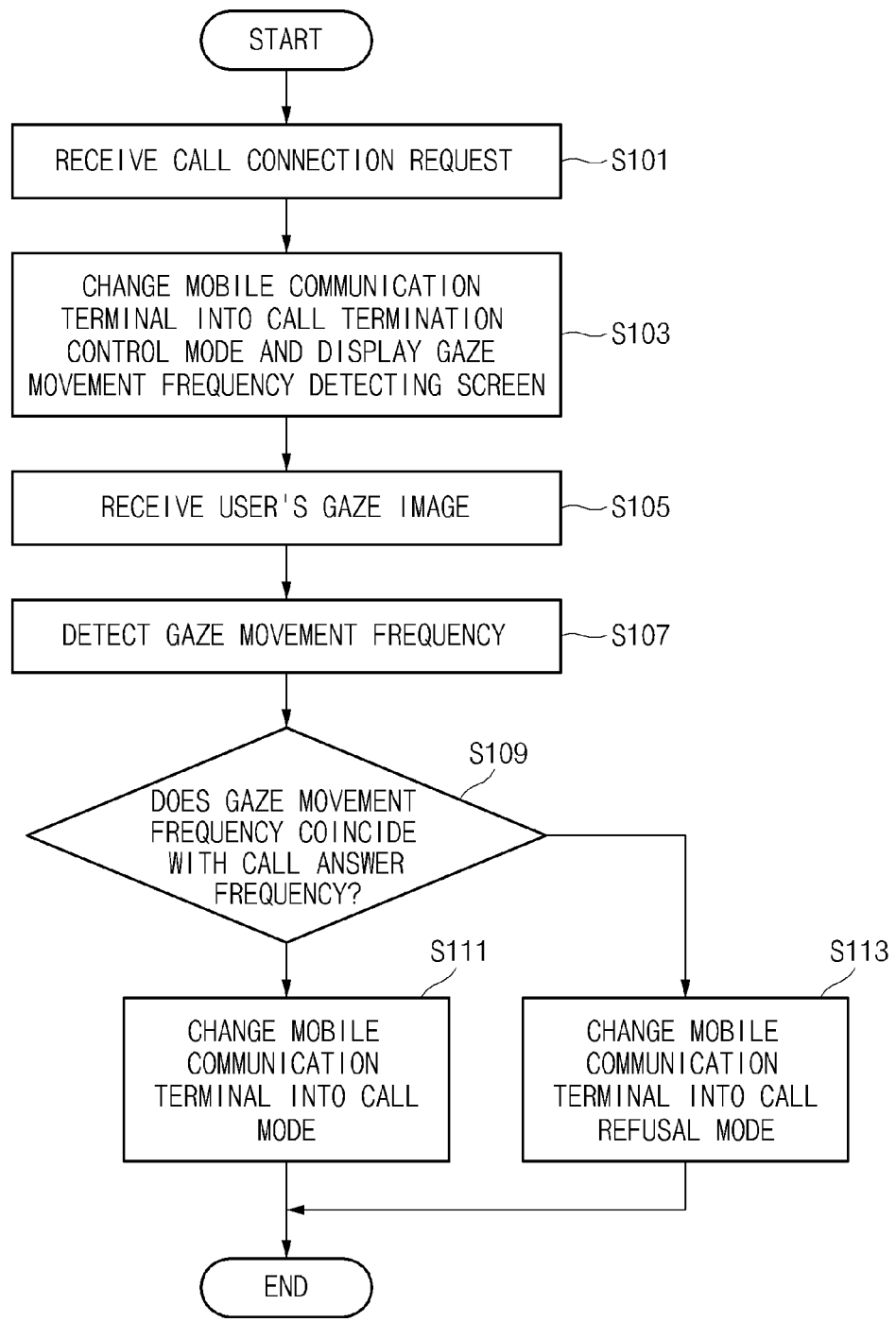
FIG. 3 is a flow chart for describing a method for controlling call termination based on a user's gaze according to the exemplary embodiment of the present disclosure.

FIG. 3 is a flow chart for describing a method for controlling call termination based on a gaze according to the exemplary embodiment of the present invention.

First, the mobile communication terminal 100 may receive a call connection request from the originating mobile communication terminal (S101).

Then, a mode of the mobile communication terminal 100 may be changed into a call termination control mode to display the gaze movement frequency detecting screen (S103).

At this time, the mobile communication terminal 100 may display a call answer section displaying a pointer moving according to a call answer frequency and a call decline section displaying a pointer moving according to a call decline frequency on the gaze movement frequency detecting screen.

That is, the above-mentioned call answer section and call decline section display the pointers moving according to the call answer frequency and the call decline frequency, respectively, in order to distinguish which of the call answer and the call decline the user selects.

Next, the mobile communication terminal 100 may detect the user's eyeball image moving according to the display of the gaze movement frequency detecting screen (S105). At this time, the mobile communication terminal 100 may detect the user's eyeball image through the camera apparatus 10 mounted therein.

Next, the mobile communication terminal 100 may detect the user's gaze movement frequency based on the user's eyeball image (S107).

At this time, the mobile communication terminal 100 performs the Fourier transform or the unequally spaced fast Fourier transform on the user's eyeball image moving according to the pointer of the call answer section or the call decline section to detect the user's gaze movement frequency.

Next, the mobile communication terminal 100 may compare the user's gaze movement frequency with preset call answer and call decline frequencies to confirm whether or not they coincide with each other (S109).

When it is confirmed, in the step S109, that the user's gaze movement frequency coincides with the call answer frequency, the mode of the mobile communication terminal 100 may be changed into a call mode (S111).

When it is confirmed, in the step S109, that the user's gaze movement frequency coincides with the call decline frequency, the mode of the mobile communication terminal 100 may be changed into a call refusal mode (S113).

For example, the mobile communication terminal 100 judges the call decline in the case in which an absolute value of a difference between the user's gaze movement frequency ($f_{eye}$) and the call decline frequency ($f_1$) is equal to or smaller than a reference value through $|f_{eye}-f_1| \leq \epsilon_{thres}$ and judges the call answer in the case in which an absolute value of a difference between the user's gaze movement frequency ($f_{eye}$) and the call answer frequency ($f_2$) is equal to or smaller than a reference value through $|f_{eye}-f_2| \leq \epsilon_{thres}$.

The method for controlling call termination based on a user's gaze described above may be implemented in a form of program commands capable of being executed through various computer devices to thereby be recordable in a computer-readable recording medium. Here, the computer-readable recording medium may include a program command, a data file, a data structure or the like, alone or a combination thereof.

Meanwhile, the program command recorded in the computer-readable recording medium may be especially designed and constituted for the present inventive concept or be known to those skilled in a field of computer software.

Examples of the computer-readable recording medium may include a magnetic medium such as a hard disk, a floppy disk, or a magnetic tape; an optical recording medium such as a compact disk read only memory (CD-ROM), or a digital versatile disk (DVD); a magneto-optical medium such as a floptical disk; and a hardware device specially constituted to store and perform program commands, such as a ROM, a random access memory (RAM), a flash memory, or the like. Meanwhile, the computer readable medium may also be a transmission medium such as light including a carrier transmitting a signal specifying a program command, a data structure, or the like, a metal line, a waveguide, or the like.

In addition, examples of the program commands may include a high-level language code capable of being executed by a computer using an interpreter, or the like, as well as a machine language code made by a compiler. The above-mentioned hardware device may be constituted to operate as at least one software module in order to perform an operation according to the present disclosure, and vice versa.

With the method for controlling call termination based on a user's gaze, and the mobile communication terminal therefor according to the exemplary embodiments of the present disclosure, since the operation of the mobile communication terminal may be controlled through the user's gaze movement, the user may select the call answer or the call decline for the call termination even in a situation in which a touch operation of the mobile communication terminal is difficult.

In addition, according to the exemplary embodiments of the present disclosure, the user of the mobile communication terminal may operate the mobile communication terminal only through his/her gaze movement without purchasing a separate device such as a touch pen, gloves for a touch, or the like, which is advantageous in view of a cost and improves usability.

Although the exemplary embodiment of the present disclosure has been disclosed for illustrative purposes, it will be appreciated that the present disclosure is not limited thereto, and those skilled in the art will appreciate that various modifications, additions and substitutions are possible, without departing from the scope and spirit of the inventive concept.

Accordingly, any and all modifications, variations or equivalent arrangements should be considered to be within the scope of the inventive concept, and the detailed scope of the disclosure will be disclosed by the accompanying claims.

What is claimed is:

1. A mobile communication terminal for controlling call termination based on a user's gaze, the mobile communication terminal comprising:
   a wireless communicating unit;
   a call termination control mode managing unit configured to change a mode of the mobile communication terminal into a call termination control mode as a call connection request is received from an originating mobile communication terminal, thereby displaying a gaze movement frequency detecting screen, the gaze movement frequency detecting screen containing one or more moving objects;

an image detecting unit configured to detect a user's eyeball image moving according to at least one of the moving objects on the gaze movement frequency detecting screen through a camera apparatus;

a gaze movement frequency detecting unit configured to detect a user's gaze movement frequency based on the user's eyeball image;

a call answer and decline judging unit configured to compare the user's gaze movement frequency with preset call answer and call decline frequencies and judge a call answer or a call decline according to frequencies coinciding with each other; and a call termination control processing unit configured to perform a call mode or a call refusal mode according to the judgment of the call answer and decline judging unit, wherein the one or more moving objects are at least two pointers, and wherein the call termination control mode managing unit displays a call answer section displaying a pointer moving according to the call answer frequency and a call decline section displaying a pointer moving according to the call decline frequency on the gaze movement frequency detecting screen.

2. The mobile communication terminal according to claim 1, wherein the gaze movement frequency detecting unit performs the Fourier transform or the unequally spaced fast Fourier transform on the user's eyeball image moving according to the pointer of the call answer section or the call decline section to detect the user's gaze movement frequency.

3. The mobile communication terminal according to claim 1, further comprising:

a storing unit configured to store terminal related information including the call answer frequency and the call decline frequency therein; and an outputting unit configured to display the gaze movement frequency detecting screen according to a request of the call termination control mode managing unit and output the terminal related information in at least one form of a text, an image, and an audio.

4. The mobile communication terminal according to claim 1, wherein the call answer and decline judging unit is configured to judge the call answer or the call decline by determining whether the absolute value of a difference between the user's gaze movement frequency ($f_{eye}$) and the call decline frequency ($f_1$) is equal to or smaller than a reference value ($\epsilon_{thres}$) through $|f_{eye}-f_1| \le \epsilon_{thres}$ or whether the absolute value of a difference between the user's gaze movement frequency ($f_{eye}$) and the call answer frequency ($f_2$) is equal to or smaller than the reference value ($\epsilon_{thres}$) through $|f_{eye}-f_2| \le \epsilon_{thres}$.

5. A method for controlling call termination based on a gaze in a mobile communication terminal, the method comprising:

receiving, by the mobile communication terminal, a call connection request from an originating mobile communication terminal;

changing a mode of the mobile communication terminal into a call termination control mode to display a gaze movement frequency detecting screen containing one or more moving objects;

detecting, by the mobile communication terminal, a user's eyeball image moving according to at least one of the moving objects on the gaze movement frequency detecting screen;

detecting, by the mobile communication terminal, a user's gaze movement frequency based on the user's eyeball image;

comparing, by the mobile communication terminal, the user's gaze movement frequency with preset call answer and call decline frequencies to confirm whether or not they coincide with each other; and changing the mode of the mobile communication terminal into a call mode if the user's gaze movement frequency coincides with the call answer frequency, wherein in the step of changing the mode of the mobile communication terminal into the call termination control mode to display the gaze movement frequency detecting screen, a call answer section displaying a pointer moving according to the call answer frequency and a call decline section displaying a pointer moving according to the call decline frequency are displayed on the gaze movement frequency detecting screen.

6. The method according to claim 5, further comprising, after the step of comparing the user's gaze movement frequency with the preset call answer and call decline frequencies by the mobile communication terminal to confirm whether or not they coincide with each other, changing the mode of the mobile communication terminal into a call refusal mode in the case in which the user's gaze movement frequency coincides with the call decline frequency.

7. The method according to claim 5, wherein in the step of detecting the user's gaze movement frequency based on the user's eyeball image by the mobile communication terminal, the Fourier transform or the unequally spaced fast Fourier transform is performed on the user's eyeball image moving according to the pointer of the call answer section or the call decline section to detect the user's gaze movement frequency.

8. The method according to claim 5, wherein the step of comparing the user's gaze movement frequency with preset call answer and call decline frequencies comprises determining whether the absolute value of a difference between the user's gaze movement frequency ($f_{eye}$) and the call decline frequency ($f_1$) is equal to or smaller than a reference value ($\epsilon_{thres}$) through $|f_{eye}-f_1| \le \epsilon_{thres}$ or whether the absolute value of a difference between the user's gaze movement frequency ($f_{eye}$) and the call answer frequency ($f_2$) is equal to or smaller than the reference value ($\epsilon_{thres}$) through $|f_{eye}-f_2| \le \epsilon_{thres}$.

* * * * *